United States Patent

Epina et al.

[15] 3,703,997

[45] Nov. 28, 1972

[54] DOOR CONSTRUCTION IN A MAGNETIC TAPE DRIVE SYSTEM

[72] Inventors: August P. Epina, Boulder; Paul O. Pearson, Longmont, both of Colo.

[73] Assignee: Storage Technology Corporation, Boulder, Colo.

[22] Filed: June 25, 1971

[21] Appl. No.: 156,618

[52] U.S. Cl. .................................. 242/182, 242/210

[51] Int. Cl. ........................ G11b 15/58, G11b 23/12

[58] Field of Search ...................... 242/182–186, 210; 226/95, 97; 49/303, 315, 368

[56] References Cited

UNITED STATES PATENTS

| | | | |
|---|---|---|---|
| 3,074,661 | 1/1963 | Brumbaugh et al. | 242/184 |
| 3,310,250 | 3/1967 | Michiels et al. | 242/184 |

*Primary Examiner*—Leonard D. Christian

*Attorney*—Woodcock, Washburn, Kurtz & Mackiewicz

[57] ABSTRACT

The vacuum buffer zone of a computer magnetic tape drive unit is covered by a door having two parallel plates of glass. By channeling acoustical noise generated by the unit into a chamber formed between the glass plates through openings in the inner glass plate, a substantial reduction in noise is achieved. In addition, the openings permit the chamber to be evacuated before the tape is drawn down into the buffer zone. As the chamber is evacuated, the atmosphere forces the outer glass plate and the door frame against the inner glass plate which then forms a vacuum tight seal between the inner glass plate and guide members in the buffer zone.

15 Claims, 3 Drawing Figures

PATENTED NOV 28 1972 3,703,997

DOOR CONSTRUCTION IN A MAGNETIC TAPE DRIVE SYSTEM

BACKGROUND OF THE INVENTION

1. Field of the Invention

This invention relates to magnetic tape drives, and more particularly, to magnetic tape drives having evacuated buffer zones.

High performance digital magnetic tape drive units are extensively used in computing systems. Examples of a high performance magnetic tape drive unit is the STC 2470 manufactured by the assignee of this invention and the IBM 2420 Model 5 described in the IBM Systems Reference Library Bulletin, file No. S/360–05. Units such as this include a file reel, a machine reel and a capstan for driving the magnetic tape past the heads and between the file reel and the machine reel.

High-performance tape drives require tape buffer zones to allow for the difference in acceleration rates between the capstan motor and the reel motors. A capstan motor can accelerate the magnetic tape from a standstill to 200 inches per second in less than 2 milliseconds while reel motors may take up to 20 milliseconds to accelerate from a standstill to about 200 inches per second. A slack in tape must therefore be provided between the capstan motor and the reel motor to couple the inertia of the magnetic tape as the reel motors come up to speed. The buffer zone which comprises an evacuated vertical column and an evacuated tapered chamber receiving tape on each side of the capstan stores the slack in tape.

At the end of each vacuum column and each tapered chamber is a vacuum source which pulls the tape into the column and chamber. When the capstan moves the tape, the loops of tape in the ends of the tapered chambers and the bottoms of the columns move outward and upward respectively away from the vacuum sources. This tape motion causes a pumping of air which in turn causes acoustical noise much in the same way as a loud speaker. This noise in a computer room can become annoying to operators and may even result in a hearing loss with long periods of exposure to the noise.

2. The Prior Art

The conventional high performance tape drive for computers utilizes a door comprising a single glass plate which forms the outer wall of the vacuum buffer zone when the door is closed. A single plate of glass is not particularly effective in reducing the noise level within a computer room to acceptable levels for the operators. Previous attempts to reduce this noise level have involved the use of an additional door comprising a glass plate overlying the entire front of the tape drive unit. It has been found that the additional glass plate has not been particularly effective in reducing the noise level.

Considerable difficulties have also been encountered in achieving an adequate glass-to-metal seal between the buffer zone glass plate and the metal tape guide members which define the evacuated columns and tapered chambers within the buffer zone. The degree of evacuation and the limited area of evacuation in the columns and tapered chambers have not been sufficient to achieve an atmospheric assist in closing and self-sealing the door. It is of course necessary to achieve a fairly high degree of evacuation within the buffer zone to permit the buffer zone to perform properly. In the absence of a good seal between the guide members and the glass plate, this high degree of evacuation may not be achieved.

SUMMARY OF THE INVENTION

It is one object of this invention to reduce the noise level associated with a high performance tape drive having an evacuated buffer zone.

In accordance with this object, a tape drive having a file reel, a machine reel, a magnetic head mounted intermediate the reels, and a capstan for driving the magnetic tape in both directions past the head and between the reels is provided with a door frame having two spaced panels forming the front wall of the buffer zone when the door is closed. By providing at least one noise outlet opening in the inner panel, the noise generated within the buffer zone may be channeled into and dissipated within the chamber formed in the space between the inner panel and in the outer panel.

In one preferred embodiment, two openings are utilized, each opening being located at the intersection of the center lines for an evacuated vertical column and an evacuated tapered chamber. The waves of noise generated by the tape motion within the buffer zone will then meet at the openings and be channeled into the chamber between the panels through the openings. Not only do the openings permit the noise to be channeled into the chamber, they also provide a change in the smooth throat within the buffer zone to cause a change in sound wave patterns and create an area of turbulence which in turn distorts the uniform sound waves.

It is another object of this invention, to achieve a good seal between the buffer zone door and the guide members within the buffer zone.

In accordance with this object, it has been found that the noise openings allow the chamber between the inner panel and the outer panel to be evacuated during threading as the tape is drawn into the vertical columns and tapered chambers under the influence of the vacuum source communicating with the ends of the columns of chambers. As a result, the buffer zone door is forced tightly closed under the influence of atmospheric pressure over the entire surface of the outer panel so as to create a vacuum-tight seal between the inner panel and the guide members within the buffer zone. Once the tape loops reach the noise outlet openings, the vacuum within the chamber between the panels is dissipated. However, the seal between the inner panel and the guide members having been once established remains as a result of the high degree of evacuation achieved in the vertical columns and the tapered chambers and the atmospheric pressure on the inner panel in those areas.

DETAILED DESCRIPTION OF THE PREFERRED EMBODIMENT

Figure 3:
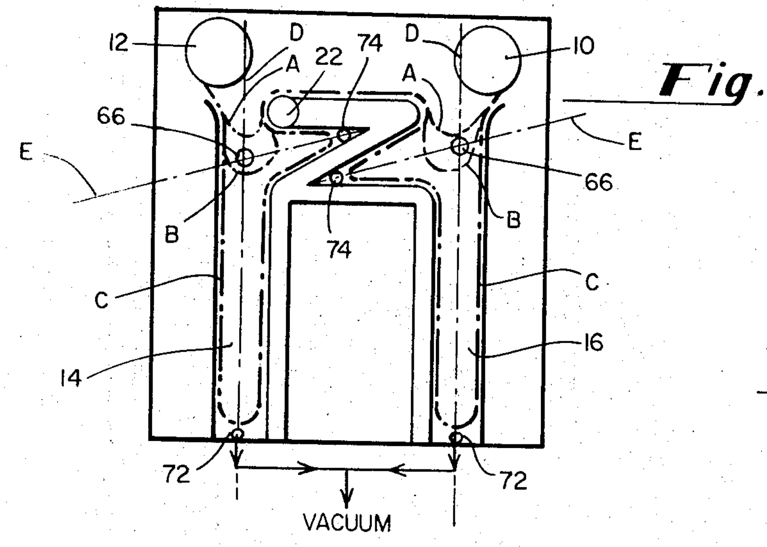
FIG. 3 is a schematic diagram of the tape drive unit of FIG. 1 showing various stages in the threading operation.

Referring to the drawings there is shown a magnetic tape recording and reproducing system including a file reel 10 and a machine reel 12. A buffer zone including vertical columns 14 and 16 and tapered, horizontally extending chambers 18 and 20 are located on opposite sides of a capstan 22 which drives the tape past a magnetic read/write head 24 and an erase head 26. The path of the tape between the file reel 10 and the machine reel 12 is guided and determined by air bearings 28, 30, 32, 34 and 36 as well as guides 38 and 40. The tape is further guided in this path by column-forming members 42, 44, 46 and 48 as well as tapered chamber-forming members 50, 52 and 56. Threading channels 58 and 60 are also provided above the guides 38 and 40 and a tape sensor 62 is located above the guide member 56 and at one side of the guide 40.

Figure 2:
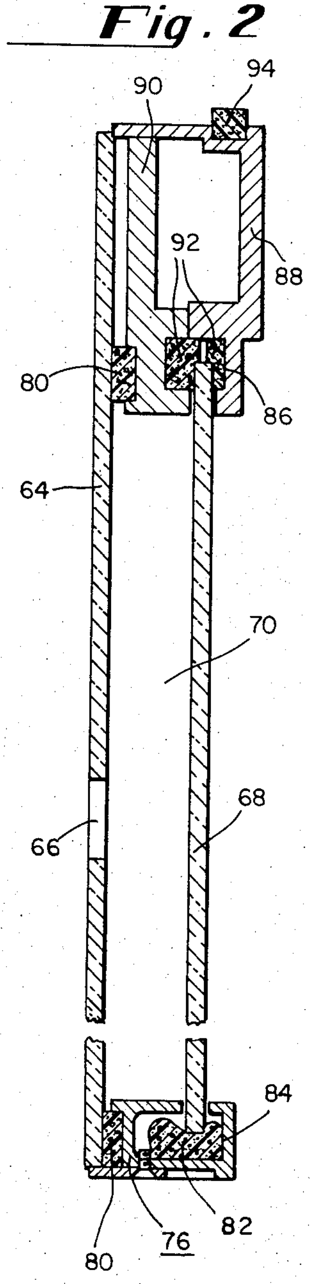
FIG. 2 is a sectional view of the buffer zone door taken along line 2—2.
Figure 1:
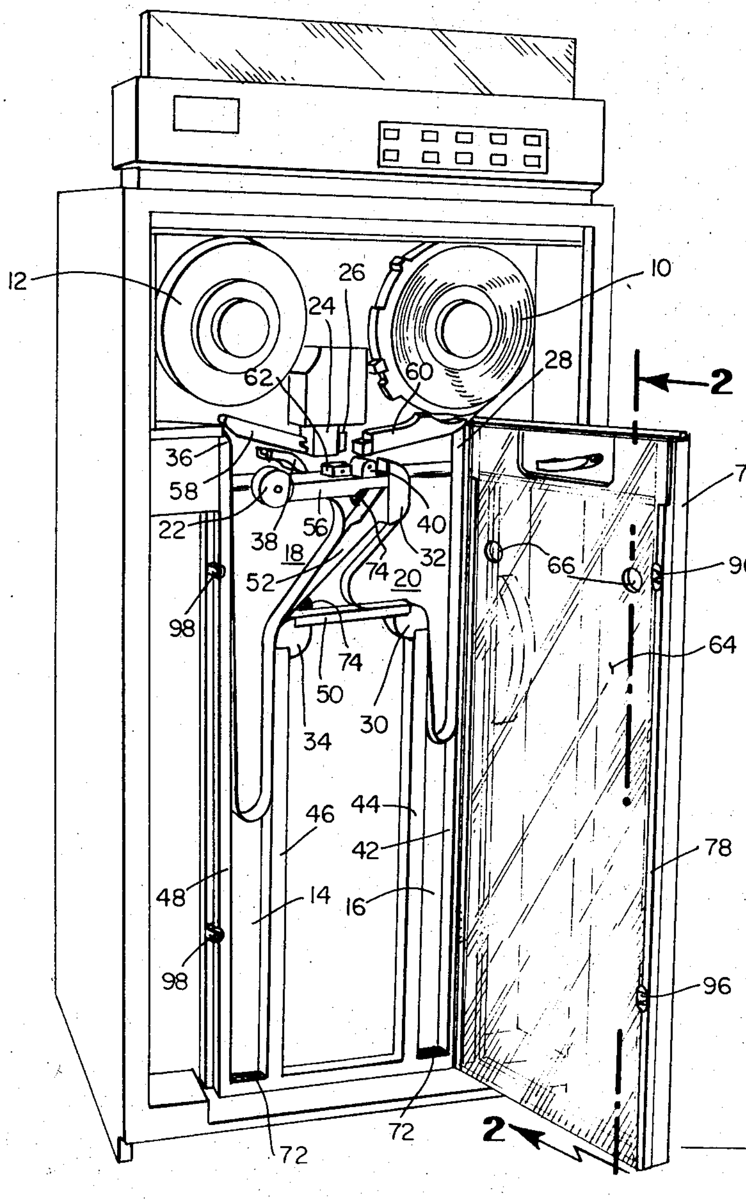
FIG. 1 is an isometric view of a computer tape drive unit embodying the invention.

In accordance with this invention, a double-panel door construction is provided for reducing the acoustical noise level generated by the tape drive unit. As best shown in FIG. 2, the door comprises an inner panel in the form of a glass plate 64 having noise outlet openings 66 therein and an outer panel in the form of a glass plate 68 which is spaced from the plate 64 to form a noise dissipation chamber 70 therebetween. When the door is closed, the inner plate 64 will rest against the guide members in the buffer zone. During the operation of the unit, the noise created by the upward movement of the tape loops within the vertical columns 14 and 16 away from the vacuum source vent 72 and the noise created by the outward movement of the tape loops in the tapered chambers 18 and 20 away from the vacuum source vents 74 will be channeled into the chamber 70 through the noise outlet openings 66 and dissipated therein. Furthermore, it has been found that the holes also provide a change in the smooth throat of the buffer zone to cause a change in sound wave patterns and create an area of turbulence which in turn distorts the uniform sound waves thereby further diminishing the audible noise generated by the tape drive unit.

The glass plates 64 and 68 are mounted on a single, hinged door frame 76 having a lip 78 holding the inner glass 64 in place against a foam sealing material 80. The outer glass plate 68 is embedded along its edges in a foam sealing material 82 contained within a channel 84 on the bottom and sides of the door frame 76. Another channel 86 is formed between a decorative face member 88 and a consealed transverse frame member 90. The channel 86 is also filled with foam 92 to receive the upper edge of the glass plate 68. A strip of foam 94 may also be provided in a groove along the upper edge of the decorative facing 88 for sealing the top of the door.

In accordance with another important aspect of the invention, the double-panel door construction provides a self-closing, self-sealing aspect after the door is closed and latch members 96 and 98 are engaged. When the buffer zone door is closed and threading of the tape is initiated, the chamber 70 is evacuated through the vacuum source vents 72 and 74 which evacuate the buffer zone at a rate of 40 cubic feet of air per minute. As a result, the atmospheric pressure presses against the entire face of the outer glass plate 68 which in turn forces the frame 76 back against the inner glass plate 64. The inner glass plate 64 is then effectively slammed against the guide members within the buffer zone so as to create a very tight glass-to-metal seal between the inner glass plate 64 and those guide members. As threading proceeds further, the tape loops are drawn toward the ends of the tapered chambers 18 and 20 and the bottoms of the vertical columns 14 and 16 past the openings 66. When the tape reaches the openings 66, the tape interrupts the communication between the vacuum source vents 72, 74 and the chamber 70, and the vacuum within the chamber 70 is then dissipated. The pressure against the outer glass plate 68 in turn drops but the vacuum within the tapered chambers 18 and 20 and the vertical columns 14 and 16 is now sufficient to maintain the very tight seal which was achieved during evacuation by the chamber 70.

Referring now to FIG. 3, the broken line A represents the position of the tape when threading is initiated. Note that the tape has not yet reached the noise outlet opening 66 and therefore does not yet interfere with the evacuation of the chamber 70 by means of the vacuum source vents 72 and 74. However, when the tape reaches the position shown by broken line B, the vacuum source vents 72 and 74 are cut off to a very great extent by the tape since the buffer zone is only slightly deeper than the width of the tape itself. The vacuum within the chamber 70 is then dissipated although a very good seal is maintained between the inner glass plate 64 as the tape moves to the position shown by the broken line C since the evacuation of the columns 14 and 16 and to some degree the tapered chambers 18 and 20 is sufficient in itself to maintain the seal.

FIG. 3 also reveals the location of the noise outlet opening 66. The waves of noise generated by the tape motion within the columns and the chambers of the buffer zone will meet at the intersection of the center lines D and E for these columns and chambers. Accordingly, the outlet openings 66 are located at these intersections as clearly shown in FIG. 3 to maximize their effectiveness.

Although the particular tape drive unit illustrated and described is similar to that disclosed in copending application Ser. No. 139,708, filed May 3, 1971 which is incorporated herein by reference, it will be appreciated that the double-panel door construction may be utilized in other tape drive units. It will of course be understood that other such uses of the invention and modifications in the particular preferred embodiment illustrated and described fall within the scope of the invention as set forth in the appended claims.

What is claimed:

1. A magnetic tape unit comprising:

a file reel and a machine reel;

a magnetic head mounted intermediate said reels;

a capstan for driving magnetic tape in both directions past said head and between said reels;

a vacuum buffer zone on each side of said capstan for receiving tape; and a door comprising an inner panel, an outer panel and a door frame means mounting said inner panel and said outer panel with a space therebetween, said inner panel having at least one noise outlet opening therein communicating with the space between said inner panel and said outer panel so as to reduce the audible noise by permitting the channeling of said noise into the chamber formed in the space between said inner panel and said outer panel.

2. The magnetic tape unit of claim 1 wherein said chamber is substantially air-tight except for said opening through said inner panel, said chamber being evacuated through said opening when said door is closed and threading of the tape is initiated so as to force said door tightly closed.

3. The magnetic tape unit of claim 2 wherein said buffer zone includes guide means forming a pair of vertical buffer columns beneath said reels and having vacuum source vents at the bottoms thereof, said tape being pulled downwardly toward said end under the influence of said vacuum sources, said inner panel forming an air-tight seal with said guide means.

4. The magnetic tape unit of claim 3 wherein said guide means also forms a pair of buffer tapered chambers in said buffer zone having vacuum source vents at the ends thereof.

5. The magnetic tape unit of claim 1 having one noise outlet opening located at the junction of one said vertical columns and one said tapered chambers and another noise outlet opening located at the junction of the other of said vertical columns and the other of said tapered chambers.

6. The magnetic tape unit of claim 5 wherein said openings are located at the intersection of the center lines for said one vertical column and said one tapered chamber and the intersection of the center lines for said other vertical column and said other tapered chamber.

7. The magnetic tape unit of claim 6 wherein said inner panel and said outer panel comprise an inner glass plate and an outer glass plate respectively, said door further comprising resilient sealing means located between said frame means and said inner glass plate and between said frame means and said outer glass plate so as to render said chamber between said inner glass plate and said outer glass plate substantially air-tight.

8. The magnetic tape unit comprising:

a file reel and a machine reel;

a magnetic head mounted intermediate said file reel and said machine reel;

a capstan for driving magnetic tape in both directions past said head and between said file reel and said machine reel;

a vacuum buffer zone on each side of said magnetic head for receiving tape;

a hinged door for covering said buffer zone to permit the at least partial evacuation thereof, said door comprising a door frame means, an inner panel mounted on said frame means and an outer panel mounted on said frame means so as to provide a space between said inner panel and said outer panel, and a means for evacuating the space between said inner panel and said outer panel thereby achieving an atmospheric assist in closing said door on said buffer zone.

9. The magnetic tape unit of claim 8 wherein said means for evacuating said space is operative only during the initial threading stage of said tape unit.

10. The magnetic tape unit of claim 9 wherein said means for evacuating said space is operative only until the tape reaches the predetermined position in said buffer zone during the initial threading stages.

11. The magnetic tape unit of claim 10 wherein said means for evacuating comprises at least one opening in said inner panel permitting communication with vacuum source vents in said buffer zone.

12. A magnetic tape unit comprising:

a file reel and a machine reel;

a magnetic head mounted intermediate said file reel and said machine reel;

a capstan for driving magnetic tape in both directions past said head and between said file reel and said machine reel;

a vacuum buffer zone on each side of said magnetic head for receiving tape; and muffler means communicating with each said buffer zone for reducing acoustical noise generated within said buffer zone.

13. The magnetic tape unit of claim 9 wherein each said buffer zone comprises a vertical buffer column and a tapered buffer chamber, said muffler means communicating with said buffer zone at the junction between said vertical buffer column and said tapered buffer chamber.

14. The magnetic tape unit of claim 10 further comprising hinged door means closing said buffer zone, said muffler means being located in said door means.

15. The magnetic tape unit of claim 11 wherein said hinged door means comprises an inner panel, an outer panel and a door frame means mounting said inner panel and said outer panel with a space therebetween forming said muffler means, said muffler means communicating with said buffer zone through an opening in said inner panel.

* * * * *

UNITED STATES PATENT OFFICE

CERTIFICATE OF CORRECTION

Patent No. 3,703,997 Dated November 28, 1972

Inventor(s) August P. Epins et al.

Under "Abstract"

Page 1, column 2, line 1, delete "zone" and insert --zones--.
Page 1, column 2, line 2, delete "is" and insert --are--.
Page 1, column 2, line 9, delete "zone" and insert --zones--.
Page 1, column 2, line 13 delete "zone" and insert --zones--.

Under "Background of the Invention"

Column 1, line 30, delete "zone" and insert --zones--.
Column 1, line 49, delete "zone" and insert --zones--.
Column 1, lines 60 and 61, delete "zone" and insert --zones--.
Column 2, line 1, delete "zone" (first and second occurrence) and insert --zones--.

Under "Summary of the Invention"

Column 2, line 9, delete "an".
Column 2, line 9, delete "zone" and insert --zones--.
Column 2, after line 9, insert new paragraph --In accordance with this object, a tape drive having a file reel, a machine reel, a magnetic head mounted intermediate the reel and a capstan for driving the magnetic tape in both directions past the head and between the reels is provided with muffler means communicating with the buffer zones for receiving tape located on opposite sides of the magnetic head--.
Column 2, line 10, after "In" insert --further--.
Column 2, line 10, delete "a" and insert --the--.
Column 2, line 10, delete "having a".
Column 2, delete lines 11, 12 and 13.
Column 2, line 14, delete "the reels is provided with" and insert --includes--.
Column 2, line 15, delete "zone" and insert --zones--.
Column 2, lines 19, 26, 31, and 37 delete "zone" and insert --zones--.

UNITED STATES PATENT OFFICE

CERTIFICATE OF CORRECTION

Patent No. 3,703,997 Dated November 28, 1972

Inventor(s) August P. Epins et al.

It is certified that error appears in the above-identified patent and that said Letters Patent are hereby corrected as shown below:

Column 2, line 45, delete "door" and insert --doors--.
Column 2, line 46, delete "is" and insert --are--.
Column 2, line 51, delete "zone" and insert --zones--.

Column 3, line 6, delete "A buffer zone" and insert --Buffer zones--.
Column 3, line 29, delete "zone" and insert --zones--.
Column 3, lines 39 and 65, delete "zone" and insert --zones--.

Column 4, line 3, delete "zone" and insert --zones--.
Column 4, line 27, delete "zone is" and insert --zones are--.
Column 4, line 39, delete "zone" and insert --zones--.

Signed and Sealed this

*Twenty-first* Day of *November 1978*

[SEAL]

*Attest:*

RUTH C. MASON
*Attesting Officer*

DONALD W. BANNER
*Commissioner of Patents and Trademarks*